United States Patent
Jiang et al.

(10) Patent No.: US 12,505,860 B2
(45) Date of Patent: Dec. 23, 2025

(54) COMPUTING SYSTEM EXECUTING SOCIAL MEDIA PROGRAM WITH FACE SELECTION TOOL FOR MASKING RECOGNIZED FACES

(71) Applicant: Lemon Inc., Grand Cayman (KY)

(72) Inventors: Long Jiang, Culver City, CA (US);
Ryan Northway, Culver City, CA (US);
Michael Buzinover, Culver City, CA (US)

(73) Assignee: Lemon Inc., Grand Cayman (KY)

( * ) Notice: Subject to any disclaimer, the term of this patent is extended or adjusted under 35 U.S.C. 154(b) by 178 days.

(21) Appl. No.: 18/172,962

(22) Filed: Feb. 22, 2023

(65) Prior Publication Data
US 2024/0282344 A1    Aug. 22, 2024

(51) Int. Cl.
*G06T 5/70*        (2024.01)
*G06F 3/04845*    (2022.01)
*G06T 11/00*       (2006.01)
*G06V 40/16*       (2022.01)
(Continued)

(52) U.S. Cl.
CPC ........ *G11B 27/036* (2013.01); *G06F 3/04845* (2013.01); *G06T 5/70* (2024.01); *G06T 11/00* (2013.01); *G06V 40/166* (2022.01); *G06V 40/172* (2022.01); *G06T 2200/24* (2013.01); *G06T 2207/10016* (2013.01); *G06T 2207/30201* (2013.01)

(58) Field of Classification Search
CPC ........ G06F 3/04845; G06F 3/00; G06T 11/00; G06T 2200/24; G06T 2207/10016; G06T 2207/30201; G06T 5/70; G06V 40/16; G06V 40/161; G06V 40/166; G06V 40/172; G06V 40/00; G06V 10/00; G06V 20/00; G06V 30/00; G06V 2201/00; G11B 27/031; G11B 27/036; G11B 27/34
USPC .......................... 386/280, 278, 282, 239, 248
See application file for complete search history.

(56) References Cited

U.S. PATENT DOCUMENTS

| | | | |
|---|---|---|---|
| 10,008,240 B2 * | 6/2018 | Koide | G06V 10/235 |
| 2016/0034704 A1 | 2/2016 | Shim et al. | |
| 2020/0226953 A1 * | 7/2020 | Anand | G09C 5/00 |

(Continued)

OTHER PUBLICATIONS

ISA Intellectual Property Office of Singapore, International Search Report Issued in Application No. PCT/SG2024/050090, Mar. 28, 2024, WIPO, 4 pages.

(Continued)

*Primary Examiner* — Daquan Zhao
(74) *Attorney, Agent, or Firm* — Alleman Hall & Tuttle LLP

(57) ABSTRACT

A computing system is provided, including one or more processors and associated memory storing instructions that cause the one or more processors to execute a social media program. The processor is configured to recognize, via a face recognition module of the social media program, one or more faces in the video. The processor is configured to cause a graphical user interface (GUI) to be displayed. The GUI includes a face selection tool that is configured to enable a user to select at least one recognized face to be masked. The processor is configured to mask the selected at least one recognized face in the video, to thereby generate an edited video. After masking, the processor is configured to share the edited video to a social media platform for viewing by other users.

20 Claims, 6 Drawing Sheets

(51) Int. Cl.
  *G11B 27/036* (2006.01)
  *G06V 20/00* (2022.01)

(56) References Cited

U.S. PATENT DOCUMENTS

2020/0364460 A1* 11/2020 Kondabathini ...... G06V 40/168
2021/0233371 A1*  7/2021 Brake ..................... H04N 7/18
2022/0115042 A1*  4/2022 Zukerman .............. G06V 10/95

OTHER PUBLICATIONS

Liu, C. et al., "Privacy Intelligence: A Survey on Image Privacy in Online Social Networks," ACM Computing Surveys, vol. 55, No. 8, Aug. 2023, 33 pages.

* cited by examiner

COMPUTING SYSTEM EXECUTING SOCIAL MEDIA PROGRAM WITH FACE SELECTION TOOL FOR MASKING RECOGNIZED FACES

BACKGROUND

With the rise of online social media platforms, users seek to capture and share an increasing volume of content, especially in the form of short videos captured using a social media client program on a smartphone device. However, since such video content is often captured spontaneously in various places and situations, users may unintentionally capture the faces of acquaintances and strangers in the videos. Users may find this undesirable out of respect for others' privacy or simply for aesthetic reasons. Further, many users do not wish to show the faces of their family and friends in their videos to ensure online safety and privacy. Video editing applications exist that can be used to blur faces in the videos, effectively masking them. However, to use these video editing applications on videos captured using a social media client program, users must save the videos, exit the social media client program, use a separate video editing application to blur faces, and then import the edited video into the social media client program. One conventional video editing application requires several different images of a face to be blurred in a video to be inputted by the user, so the program can recognize and blur the correct face in the video. This process can be laborious and time-consuming, and potentially cost the user fees for the video editing application.

SUMMARY

To address the issues discussed herein, a computing system is provided, including one or more processors and associated memory storing instructions that cause the one or more processors to execute a social media program. The processor is configured to recognize, via a face recognition module of the social media program, one or more faces in a video. The processor is configured to cause a graphical user interface (GUI) to be displayed. The GUI includes a face selection tool that is configured to enable a user to select at least one recognized face to be masked. The processor is configured to mask the selected at least one recognized face in the video, to thereby generate an edited video. After masking, the processor is configured to share the edited video to a social media platform for viewing by other users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
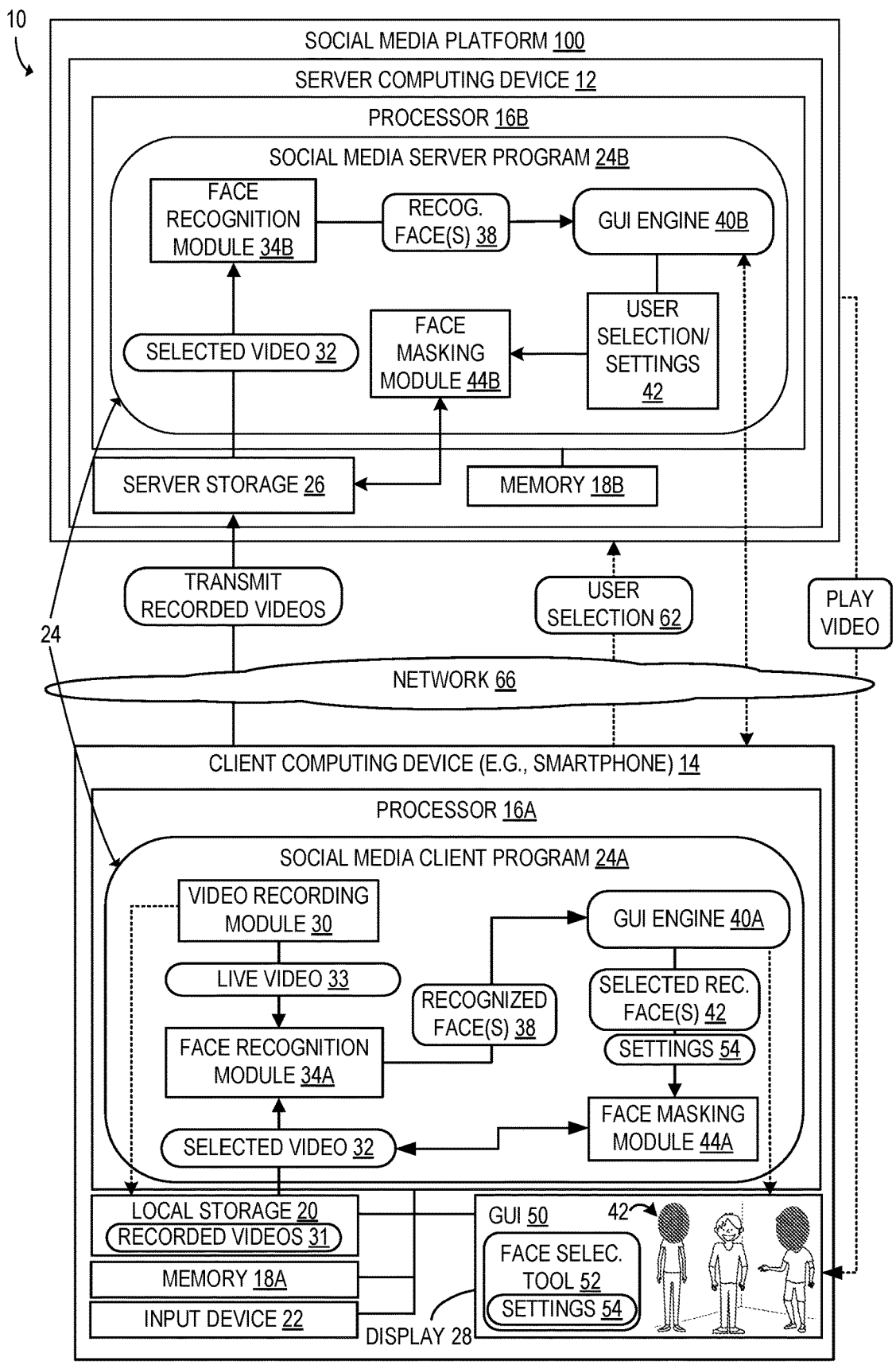
FIG. 1 shows a schematic diagram of an example computing system including a social media platform comprised of one or more server computing devices configured to communicate over a network with one or more client computing devices, according to one example implementation of the present disclosure.

As schematically illustrated in FIG. 1, to address the issues identified above, a computing system 10 including a social media platform 100 is provided. As illustrated in FIG. 1, the social media platform 100 comprises at least one server computing device 12 configured to communicate with a client computing device 14 via a computer network 66 such as the Internet. The social media platform 100 is a platform in which users can upload their own videos and view videos uploaded by other users, browse and search for videos available to watch, read and post comments and other feedback for each video, etc. The server computing device 12 may include one or more processors 16B configured to execute instructions using associated memory 18B to perform the functions and processes of the server computing device 12 described herein. The server computing device 12 may be one of a plurality of server devices within the social media platform 100, and the one or more processors 16B may be one processor of a single server device or multiple processors of multiple server devices. Below, the functions of computing system 2 as executed by processor 16B are described by way of example, and this description shall be understood to include execution on one or more processors 16B distributed among one or more of the devices discussed above.

On the client side of the computing system 10, the client computing device 14 may be used by users to interact with the social media platform 100 including the server computing device 12. The client computing device 14 may be of any suitable type such as a smartphone, tablet, personal computer, laptop, wearable electronic device, etc., that is able to access the social media platform 100 via network 66 including an internet connection. The client computing device 14 may include a processor 16A configured to execute a social media client program 24A to enact various client-side functions of the social media platform 100 on behalf of a user. The client computing device 14 may further include associated memory 18A for storing instructions, a local storage 20 for storing data, a display 28, and at least one input device 22 of any suitable type, such as a touchscreen, keyboard, buttons, accelerometer, microphone, camera, microphone, etc., for receiving user input from the user. For example, the client computing device 14 can be a mobile computing device such as a smartphone or tablet that includes at least a camera and microphone for capturing videos and a touchscreen for operating the GUI to mask faces, among the input devices 22.

Continuing with FIG. 1, the associated memory 18A may store instructions that cause the processor 16A to execute the social media client program 24A. The social media client program 24A is configured to present a video retrieved from a social media platform 100 and upload the video to the social media platform 100. The recorded videos 31 may be recorded by the user via a video recording module 30 (e.g., a smartphone camera). Alternatively, the recorded videos 31 may be also recorded by other users and shared with the user. The recorded videos 31 are stored on the local storage 20 of the client computing device 14. A user wishing to upload a video onto the social media platform 100 may select a video 32 from the recorded videos 31 stored on the local storage 20. Prior to uploading the selected video 32 to the social media platform 100, the social media client program 24A plays the selected video 32 for the user's review and editing. During the playback, the social media client program 24A enables the user to launch a masking tool for adding effects to faces in the selected video 32 to mask them. When the user turns on the masking tool, the social media client program 24A is configured to recognize, via a face recognition module 34A, one or more faces in the video 32. The face recognition module 34A may utilize a machine learning model such as a deep learning Convolutional Neural Network (CNN) to recognize the one or more faces. The social media client program 24A is further configured to cause, via a graphical user interface (GUI) engine 40A, a GUI 50 including a face selection tool 52 to be displayed on the display 28, and the face selection tool 52 is configured to enable the user to select at least one recognized face 38 to be masked. The face selection tool 52 may be displayed during playback of the video to enable the user to select the at least one recognized face 38 to be masked during playback. The face selection tool 52 may be displayed at the bottom or edge of the display 28 overlaying the selected video 32 during playback. The selected at least one recognized face 38 is masked via a face masking module 44A in the selected video 32. The selected video 32 with the masking effects applied is uploaded, via the social media client program 24A, to the social media platform 100 through network 66 and shared on the platform 100.

In the depicted example above, masking effects are added to the video 32 via the social media client program 24A of the client computing device 14 with use of the face selection tool 52. Alternatively, it will be appreciated that all or some of the functions performed by the client computing device 14 as discussed above may be performed via the server computing device 12. Accordingly a social media server program 24B is provided on the server computing device 12. Collectively, the social media client program 24A and the social media server program 24B are components of a social media program 24 that is executed in a distributed manner across the constituent devices of the computer system 10. In the depicted example of FIG. 1, the recorded videos 31 recorded by the client computing device 14 may be transmitted to the server computing device 12 and stored on a server storage 26 over computer network 66. The associated memory 18B may store instructions that cause the processor 16B to execute the social media server program 24B. The social media server program 24B is configured to present the video retrieved from the social media platform 100 and enables the user to select a video 32 from the server storage 26. In the same manner as the client computing device 14 as discussed above, the selected video 32 is selected by the user from the recorded videos 31 stored on the server storage 26 and played via the social media server program 24B for the user's review and editing. During the playback, the social media server program 24B enables the user to launch a masking tool for adding masking effects to faces in the video. When the user turns on the masking tool, the social media server program 24B is configured to recognize, via a face recognition module 34B, one or more faces in the video 32. The social media server program 24B is further configured to cause, via a GUI engine 40B, the GUI 50 including the face selection tool 52 to be displayed on the display 28 of the client computing device 14, and the face selection tool 52 is configured to enable the user to select at least one recognized face 38 to be masked. The face selection tool 52 may be displayed during playback of the video to enable the user to select the at least one recognized face 38 to be masked during playback. The selected at least one recognized face 42 in the selected video 32 is masked via a face masking module 44B. The selected video 32, with the masking effects applied, can be shared on the platform 100 via the social media server program 24B for viewing by the user and other users of the platform 100.

In one particular example of the computing system 10, the social media program 24 includes a social media client program 24A executed by a processor 16A of the one or more processors of a client computing device 14 of the computing system 10, the client computing device 14 is a mobile computing device such as a smartphone or tablet equipped with a camera, and the video is captured by the social media client program 24A executed by the client computing device 14. Further in this particular example, the social media program 24 includes a social media server program 24B executed by a processor 16B of the one or more processors of a server computing device 12 of the computing system, and the face recognition module 34A, 34B and face masking module 44A, 44B are executed at either the social media client program 24A or the social media server program 24B.

Figure 2:
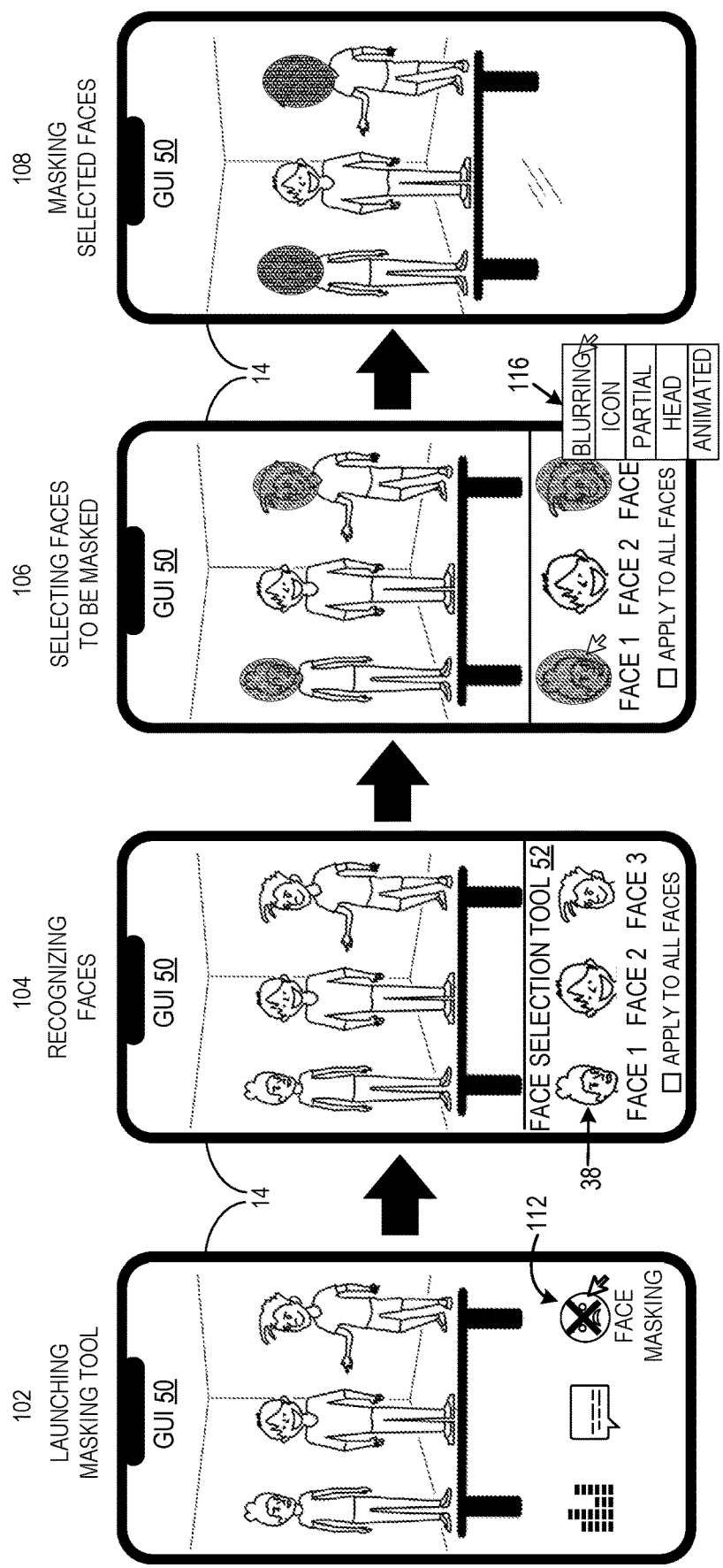
FIG. 2 illustrates an example graphical user interface (GUI) including a face selection tool that can displayed during playback of a video according to the computing system of FIG. 1.

FIG. 2 illustrates an example GUI 50 including face selection tool 52, which is displayed during playback of the video on a client computing device 14 of the computing system 10 illustrated in FIG. 1. As shown at 102 of FIG. 2, an icon 112 for the face masking tool is displayed on the GUI 50 during playback, and a user who wishes to mask one or more faces in the video 32 may click on the icon. As shown at 104, when the user clicks on the icon 112, the face selection tool 52 is displayed on the GUI 50. The face selection tool 52 may display the one or more recognized faces 38 (FACE 1, FACE 2, and FACE 3) and enables the user to select at least one recognized face 38 to be masked. As shown at 106, the at least one recognized face 38 may be selected by clicking on the at least one or more of faces of FACE 1, FACE 2, and FACE 3. Alternatively, a user may check an "apply to all faces" option to mask all recognized faces 38. In addition, a masking type may be selected by the user by choosing from a masking menu 116, which may be a pop-up menu, drop down menu, etc. In the depicted example, FACE 1 and FACE 3 are selected to be masked, and blurring is selected as the masking type. While the face selection tool 52 is on, the GUI 50 may display a preview of the video with the applied selections for the user to preview the masking effects. As depicted in the example of 108, once the masking effects are applied and the face selection tool 52 is off, the selected recognized faces 1 and 3 are masked via blurring in the video.

Figure 3A:
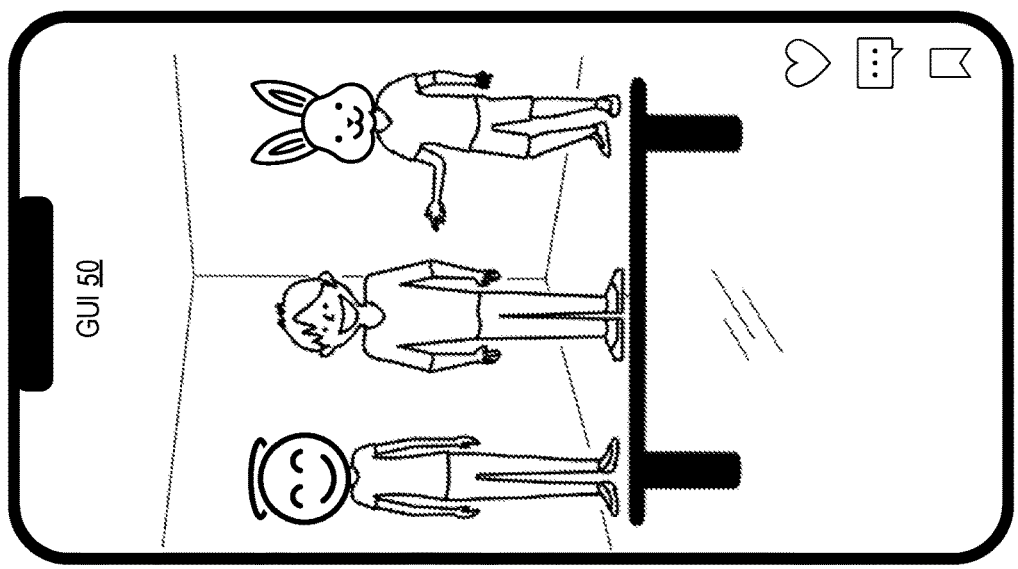
FIGS. 3A-3C show example masking effects applied to the selected at least one recognized face according to the system of FIG. 1.
Figure 3B:
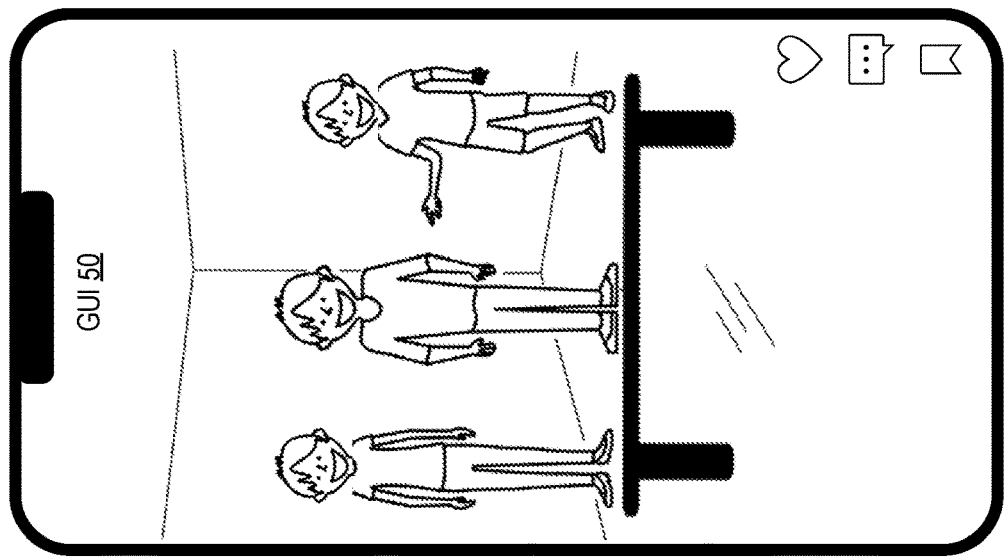
Figure 3C:
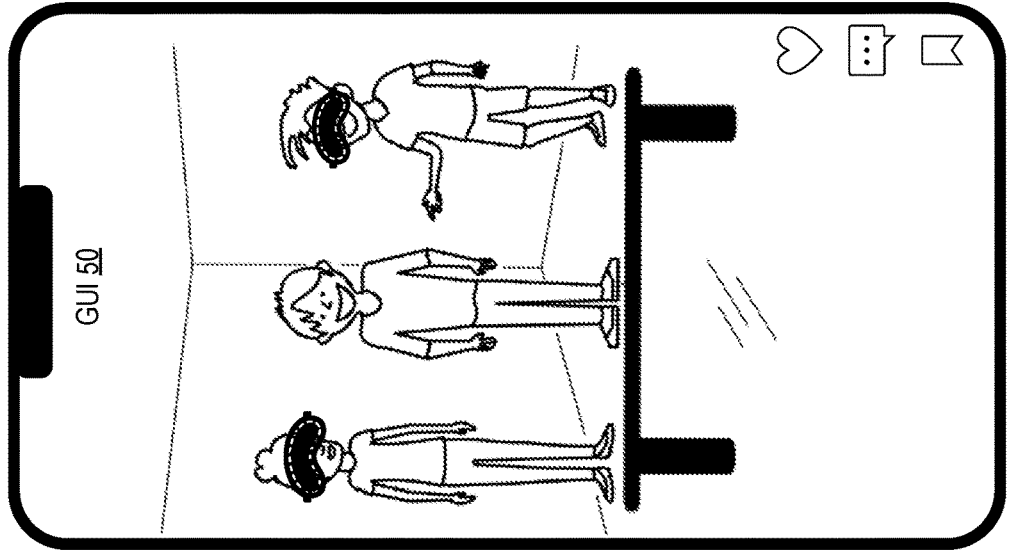

Furthermore, as shown at 106 of FIG. 2, the selected at least one recognized face 42 in the video may be masked via types of masking other than blurring as suggested by 116 of FIG. 2. FIG. 3A-3C show example masking effects applied to selected at least one recognized face 42 according to the system 10 of FIG. 1. For instance, as shown at FIG. 3A, the selected at least one recognized face 42 may be masked using a partial mask, in which only part of a selected face (e.g., eyes) is masked. As depicted in the example of FIG. 3B, the selected at least one recognized face 42 may be masked using a replacement head (e.g., user's own head or other heads selected from the video or pre-stored in memory), fully masking the selected face. Thus, all heads have the same appearance in FIG. 3B. Moreover, as shown at FIG. 3C, the selected at least one recognized face 42 may be masked using an avatar, an icon, or an animated character, also fully masking the selected face.

Figure 4:
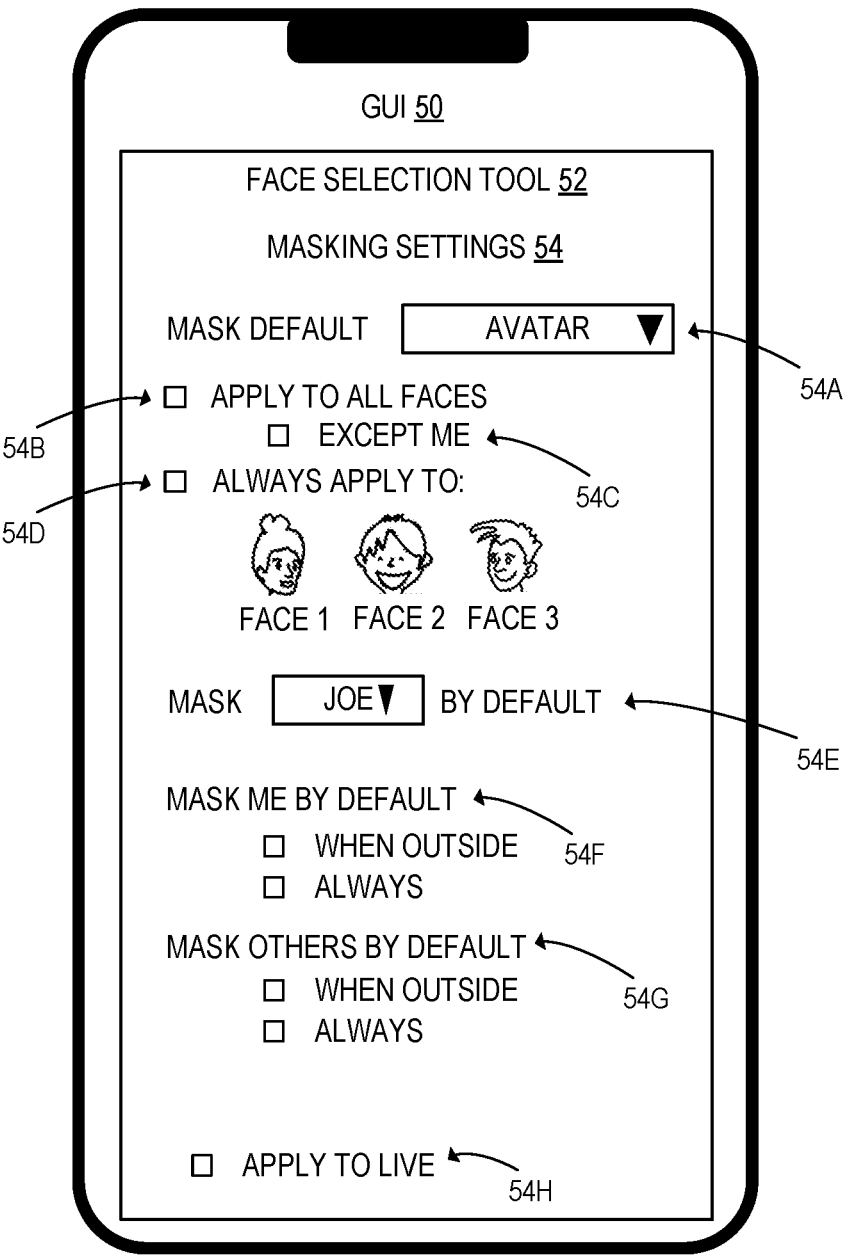
FIG. 4 shows an example graphical user interface (GUI) including the face selection tool, which is displayed prior to recording the video according to the system of FIG. 1.

In the depicted example above, the face selection tool 52 is displayed during playback to add masking effects prior to sharing the video on the social media platform 100. Moreover, the face selection tool 52 may be displayed prior to recording the video to enable the user to create user masking settings 54 and preselect the one or more recognized faces 38 to be masked prior to recording. With the face selection tool 52, the user is able to enter user masking settings 54, by which the user preselects a mask type and the one or more recognized faces 38 to be masked prior to recording or uploading. The one or more recognized faces 38 of the selected video 32 may be masked based on the user masking settings 54 automatically prior to uploading to the social media platform 100 so that the user does not need to manually edit each recorded video prior to uploading to apply masking effects. Furthermore, the one or more recognized faces 38 of a live recording may be masked based on the user masking settings 54. FIG. 4 shows an example GUI 50 including face selection tool 52, which is displayed prior to recording the video using the client computing device 14 of the computing system 10 of FIG. 1. As shown at FIG. 4, the face selection tool 52 includes a first selector 54A configured to receive a user preselection of the mask default type (e.g., avatar) and a second selector 54E configured to receive a user selection of the one or more recognized faces 38 (e.g., Joe) the user desires to always be masked. As examples, the face selector tool can include other selectors 54B, 54C, 54D, 54E configured to receive user input indicating that by default masking effects are to be applied to (1) all recognized faces in the video (selector 54B), (2) all recognized faces except for user's face (selector 54C), (3) only to specified faces in the video (selector 54D), and/or (4) to a particular selected other user's face (selector 54E). Furthermore, the selectors 54F and 54G enable the user to preselect situations when the masking effects should be applied to the user or other recognized faces, such as "always" or "when outside." Thus, selector 54F is configured to receive user input indicating whether to mask the user by default always or when outside, and selector 54G is configured to receive user input indicating whether to mask other users' faces always or when outside. Moreover, the face selection tool 52 includes a selector 54H that is configured to receive input from the user indicating that masking effects are to be applied to a live recording. The selections made via selectors 54A-54H are saved as masking settings 54.

In addition, the face selection tool 52 may be displayed during recording to enable the user to select the at least one recognized face 38 to be masked during recording. For example, the face selection tool 52 of FIG. 2 (see 104) may be displayed during recording the video and the at least one recognized face 38 may be selected by the user during recording. The masking effects are applied to the recording video instantly so that the user does not have to add masking effects onto faces in the video at a later point in time.

Figure 5:
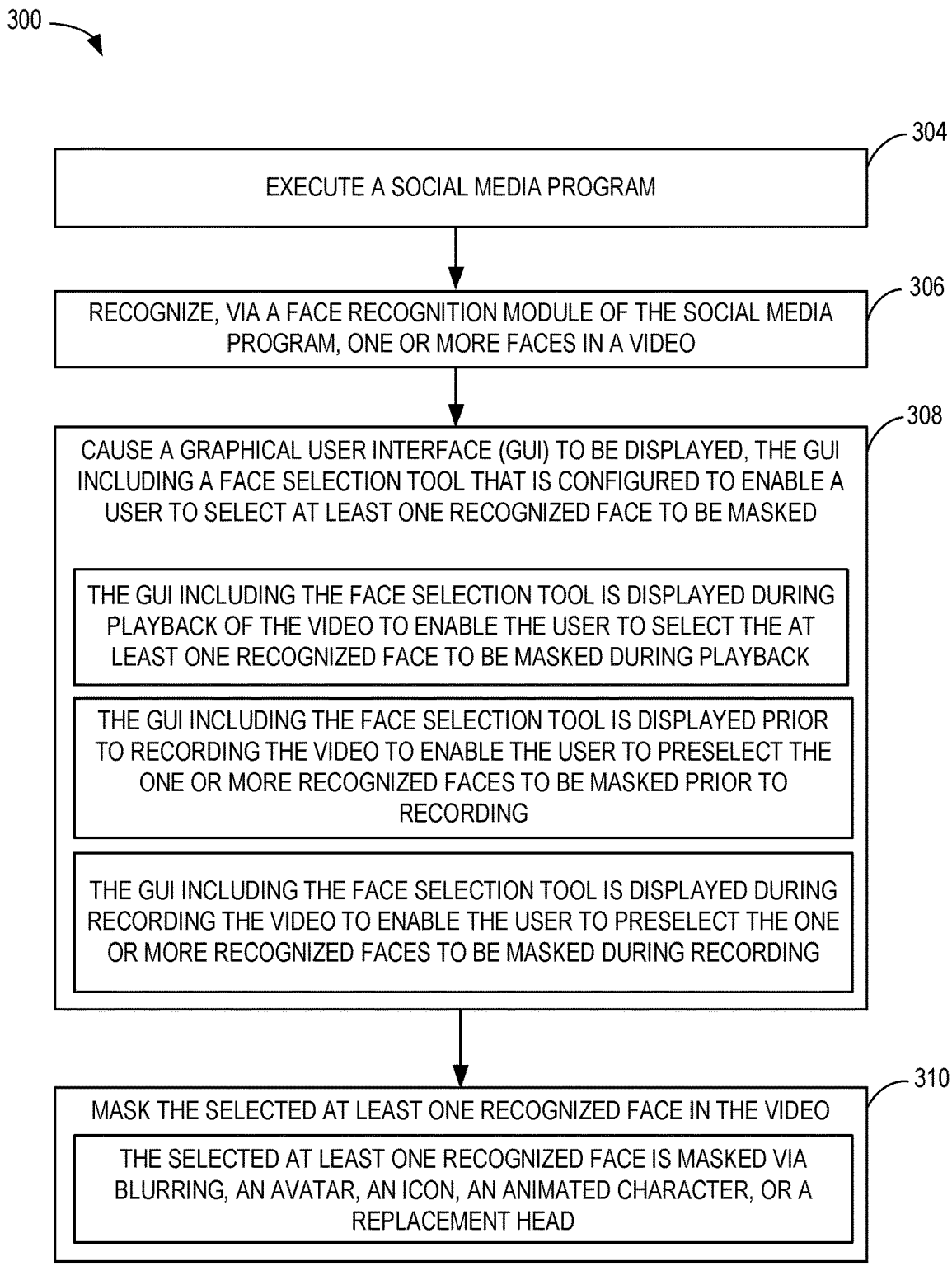
FIG. 5 shows a flowchart of a computerized method according to one example implementation present disclosure.

FIG. 5 shows a flowchart of a computerized method 300 according to one example implementation of the computing system 10 of FIG. 1. At step 304, the method may include executing a social media program. At step 306, the method may include recognizing, via a face recognition module of the social media program, one or more faces in a video. At step 308, the method may include causing a graphical user interface (GUI) to be displayed, the GUI including a face selection tool that is configured to enable a user to select at least one recognized face to be masked. The GUI including the face selection tool may be displayed during playback of the video to enable the user to select the at least one recognized face to be masked during playback. Furthermore, the GUI including the face selection tool may be displayed prior to recording the video to enable the user to preselect the one or more recognized faces to be masked prior to recording. In addition, the GUI including the face selection tool may be displayed during recording the video to enable the user to select the at least one recognized face to be masked during recording. At step 310, the method may include masking the selected at least one recognized face in the video, in which selected at least one recognized face may be masked via blurring, an avatar, an icon, an animated character, or a replacement head.

It will be appreciated that the above-described systems and methods have the potential technical benefit of adding masking effects to faces in the selected videos conveniently by masking recognized faces using the face selection tool of the social media application.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
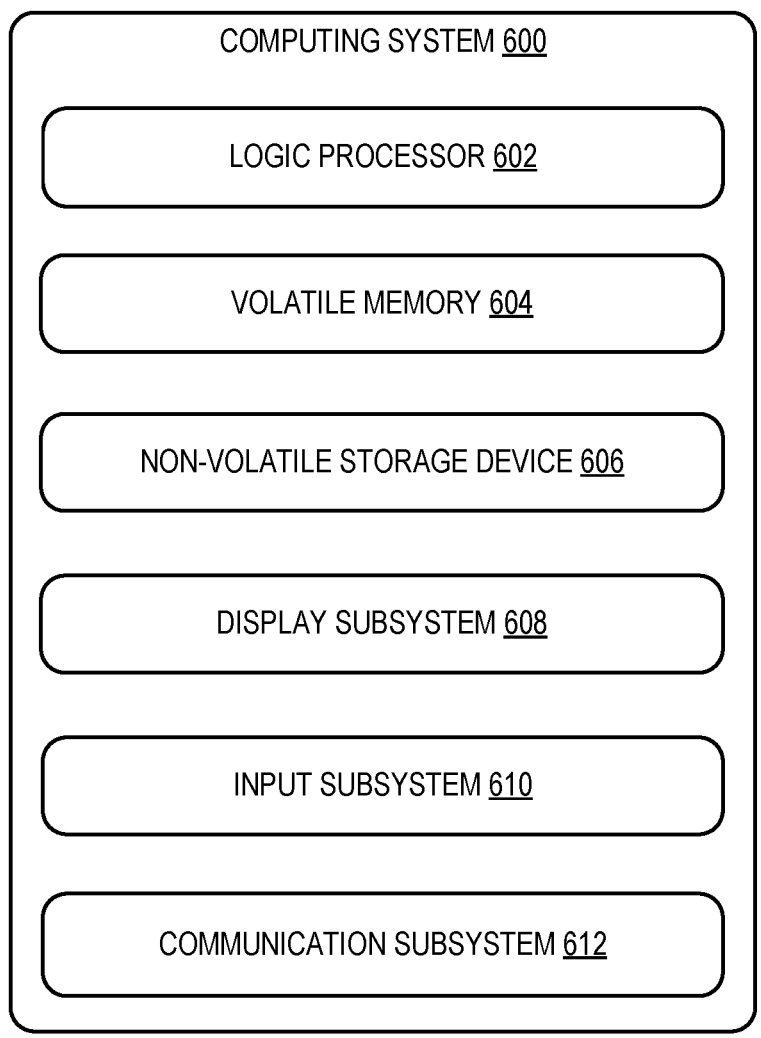
FIG. 6 shows a block diagram of an example computing system that may be utilized to implement the computing system of FIG. 1

FIG. 6 schematically shows a non-limiting embodiment of a computing system 600 that can enact one or more of the methods and processes described above. Computing system 600 is shown in simplified form. Computing system 600 may embody the computing system 10 described above and illustrated in FIG. 1. Computing system 600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display subsystem 608, input subsystem 610, communication subsystem 612, and/or other components not shown in FIG. 1.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 600 to send and/or receive messages to and/or from other devices via a network such as the Internet.

The following paragraphs provide additional support for the claims of the subject application. According to one aspect of the present disclosure, a computing system is provided. The computing system may include one or more processors and associated memory storing instructions that cause the one or more processors to execute a social media program. The processors may be further configured to recognize, via a face recognition module of the social media program, one or more faces in a video. The processors may be further configured to cause a graphical user interface (GUI) of the social media program to be displayed, the GUI including a face selection tool configured to enable a user to select at least one recognized face to be masked. The processors may be further configured to mask the selected at least one recognized face in the video to thereby generate an edited video. The processors may be further configured to share the edited video to a social media platform for viewing by other users.

According to this aspect, the selected at least one recognized face may be masked via blurring.

According to this aspect, the selected at least one recognized face may be masked using a partial mask.

According to this aspect, the selected at least one recognized face may be masked via an avatar, an icon, an animated character, or a replacement head.

According to this aspect, the GUI including the face selection tool may be displayed during playback of the video to enable the user to select the at least one recognized face to be masked during playback.

According to this aspect, the GUI including the face selection tool may be displayed prior to recording the video to enable the user to preselect the one or more recognized faces to be masked prior to recording.

According to this aspect, the processor may be further configured to mask the one or more recognized faces of the recorded video based on user masking settings.

According to this aspect, the one or more processors may be further configured to mask the one or more recognized faces of a live recording based on user masking settings.

According to this aspect, the GUI including the face selection tool may enable the user to select an option to mask a user's face by default.

According to this aspect, the GUI including the face selection tool may enable the user to select masking all recognized faces except for user's face by default.

According to this aspect, the GUI including the face selection tool may be displayed during recording of the video to enable the user to select the at least one recognized face to be masked during recording of the video.

According to this aspect, the social media program may include a social media client program executed by a processor of the one or more processors of a client computing device of the computing system, the client computing device may be a mobile computing device equipped with a camera, and the video may be captured by the social media client program executed by the client computing device. The social media program may further include a social media server program executed by a processor of the one or more processors of a server computing device of the computing system, and the face recognition module and face masking module may be executed at either the social media client program or the social media server program.

According to another aspect of the present disclosure, a computerized method is provided. The computerized method may include executing a social media program. The computerized method may further include recognizing, via a face recognition module of the social media program, one or more faces in a video. The computerized method may further include causing a graphical user interface (GUI) of the social media program to be displayed, the GUI including a face selection tool configured to enable a user to select at least one recognized face to be masked. The computerized method may further include masking the selected at least one recognized face in the video to thereby generate an edited video. The computerized method may further include sharing the edited video to a social media platform for viewing by other users.

According to this aspect, the selected at least one recognized face may be masked via blurring.

According to this aspect, the selected at least one recognized face may be masked via an avatar, an icon, an animated character, or a replacement head.

According to this aspect, the GUI including the face selection tool may be displayed during playback of the video to enable the user to select the at least one recognized face to be masked during playback.

According to this aspect, the GUI including the face selection tool may be displayed prior to recording the video to enable the user to preselect the one or more recognized faces to be masked prior to recording.

According to this aspect, the computerized method may further include masking the one or more recognized faces of the recorded video based on user masking settings.

According to this aspect, the GUI including the face selection tool may be displayed during recording of the video to enable the user to select the at least one recognized face to be masked during recording of the video.

According to another aspect of the present disclosure, a computer readable medium is provided. The computer readable medium may include instructions, when executed by one or more processors, causing the one or more processors to execute steps of a computer implemented method, including executing a social media program. The steps may further include recognizing, via a face recognition module of the social media program, one or more faces in a video. The steps may further include causing a graphical user interface (GUI) of the social media program to be displayed, the GUI including a face selection tool configured to enable a user to select at least one recognized face to be masked. The steps may further include masking the selected at least one recognized face in the video to thereby generate an edited video. The steps may further include sharing the edited video to a social media platform for viewing by other users.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
one or more processors and associated memory storing instructions that cause the one or more processors to:
execute a social media program including a masking tool;
recognize, via a face recognition module of the social media program, one or more faces in a video;
cause a graphical user interface (GUI) of the social media program to be displayed, the GUI including a face selection tool configured to enable a user to select at least one recognized face to be masked;
mask, via the masking tool of the social media program, the selected at least one recognized face in the video based on user masking settings by adding a respective effect to the selected at least one recognized face in the video to thereby generate an edited video, the user masking settings including options to mask all faces other than a user's face only when the user is outside; and
share the edited video to a social media platform for viewing by other users.

2. The computing system of claim 1, wherein the selected at least one recognized face is masked via blurring.

3. The computing system of claim 1, wherein the selected at least one recognized face is masked using a partial mask.

4. The computing system of claim 1, wherein the selected at least one recognized face is masked via an avatar, an icon, an animated character, or a replacement head.

5. The computing system of claim 1, wherein the GUI including the face selection tool is displayed during playback of the video to enable the user to select the at least one recognized face to be masked during playback.

6. The computing system of claim 1, wherein the GUI including the face selection tool is displayed prior to recording the video to enable the user to preselect the one or more recognized faces to be masked prior to recording.

7. The computing system of claim 6, wherein the processor is further configured to mask the one or more recognized faces of the recorded video based on the user masking settings.

8. The computing system of claim 6, wherein the one or more processors is further configured to mask the one or more recognized faces of a live recording based on the user masking settings.

9. The computing system of claim 6, wherein the GUI including the face selection tool enables the user to select an option to mask the user's face by default.

10. The computing system of claim 6, wherein the GUI including the face selection tool enables the user to select masking all recognized faces except for the user's face by default.

11. The computing system of claim 1, wherein the GUI including the face selection tool is displayed during recording of the video to enable the user to select the at least one recognized face to be masked during recording of the video.

12. The computing system of claim 1, wherein
the social media program includes a social media client program executed by a processor of the one or more processors of a client computing device of the computing system, the client computing device is a mobile computing device equipped with a camera, and the video is captured by the social media client program executed by the client computing device,
the social media program includes a social media server program executed by a processor of the one or more processors of a server computing device of the computing system, and
the face recognition module and face masking module are executed at either the social media client program or the social media server program.

13. A computerized method, comprising:
executing a social media program including a masking tool;
recognizing, via a face recognition module of the social media program, one or more faces in a video;
causing a graphical user interface (GUI) of the social media program to be displayed, the GUI including a face selection tool configured to enable a user to select at least one recognized face to be masked;
masking, via the masking tool of the social media program, the selected at least one recognized face in the video based on user masking settings by adding a respective effect to the selected at least one recognized face in the video to thereby generate an edited video, the user masking settings including options to mask all faces other than a user's face only when the user is outside; and
sharing the edited video to a social media platform for viewing by other users.

14. The computerized method of claim 13, wherein the selected at least one recognized face is masked via blurring.

15. The computerized method of claim 13, wherein the selected at least one recognized face is masked via an avatar, an icon, an animated character, or a replacement head.

16. The computerized method of claim 13, wherein the GUI including the face selection tool is displayed during playback of the video to enable the user to select the at least one recognized face to be masked during playback.

17. The computerized method of claim 13, wherein the GUI including the face selection tool is displayed prior to recording the video to enable the user to preselect the one or more recognized faces to be masked prior to recording.

18. The computerized method of claim 17, further comprising:
masking the one or more recognized faces of the recorded video based on the user masking settings.

19. The computerized method of claim 13, wherein the GUI including the face selection tool is displayed during recording of the video to enable the user to select the at least one recognized face to be masked during recording of the video.

20. A non-transitory computer readable medium including instructions stored thereon, the instructions, when executed by one or more processors, causing the one or more processors to execute steps of:
executing a social media program including a masking tool;
recognizing, via a face recognition module of the social media program, one or more faces in a video;
causing a graphical user interface (GUI) of the social media program to be displayed, the GUI including a face selection tool configured to enable a user to select at least one recognized face to be masked;
masking, via the masking tool of the social media program, the selected at least one recognized face in the video based on user masking settings by adding a respective effect to the selected at least one recognized face in the video to thereby generate an edited video, the user masking settings including options to mask all faces other than a user's face only when the user is outside; and
sharing the edited video to a social media platform for viewing by other users.

* * * * *